United States Patent
Rubinger

(10) Patent No.: US 10,176,239 B2
(45) Date of Patent: Jan. 8, 2019

(54) AUTOMATION-ASSISTED CURATION OF TECHNICAL SUPPORT INFORMATION

(75) Inventor: Benjamin I. Rubinger, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 1104 days.

(21) Appl. No.: 13/454,835

(22) Filed: Apr. 24, 2012

(65) Prior Publication Data

US 2013/0282725 A1    Oct. 24, 2013

(51) Int. Cl.
   G06F 7/00       (2006.01)
   G06F 17/30      (2006.01)
   G06Q 10/00      (2012.01)

(52) U.S. Cl.
   CPC .. *G06F 17/30572* (2013.01); *G06F 17/30917* (2013.01); *G06Q 10/20* (2013.01)

(58) Field of Classification Search
   CPC ........ G06F 17/30572; G06F 17/30917; G06Q 10/20
   See application file for complete search history.

(56) References Cited

U.S. PATENT DOCUMENTS

| | | | |
|---|---|---|---|
| 7,657,436 B2 | 2/2010 | Elmore et al. | |
| 2004/0117731 A1* | 6/2004 | Blyashov | G06F 17/211 715/222 |
| 2007/0150872 A1* | 6/2007 | Vohra | G06F 11/3612 717/130 |
| 2008/0056233 A1 | 3/2008 | Ijidakinro et al. | |
| 2008/0162688 A1 | 7/2008 | Reumann et al. | |
| 2009/0150724 A1 | 6/2009 | Pramidi et al. | |
| 2010/0082620 A1 | 4/2010 | Jennings, III et al. | |
| 2011/0196864 A1* | 8/2011 | Mason | G06F 3/0416 707/728 |
| 2012/0290558 A1* | 11/2012 | Gruber | 707/711 |
| 2013/0211938 A1* | 8/2013 | Allaqaband | 705/21 |

FOREIGN PATENT DOCUMENTS

WO    2008083890 A1    7/2008

OTHER PUBLICATIONS

Debapriyo Majumdar et al, "Privacy protected knowledge management in services with emphasis on quality data", CIKM, Oct. 2011 (pp. 1889-1894).

* cited by examiner

*Primary Examiner* — Usmaan Saeed
*Assistant Examiner* — Paul Kim
(74) *Attorney, Agent, or Firm* — Shumaker & Sieffert, P.A.

(57) ABSTRACT

A system is disclosed for automation-assisted curation of technical information from technical support tickets into a technical information knowledge base. In one example, a method includes mapping information from a plurality of fields of a support ticket in a technical support reporting tool to a plurality of corresponding fields of a structured information file. The method further includes rendering the structured information file in a user-editable format in a user interface; saving user inputs to the structured information file, thereby generating a curated structured information file that incorporates the mapped information and the user inputs; and saving the curated structured information file to a searchable technical support information data store.

15 Claims, 8 Drawing Sheets

60

┌─────────────────────────────────────────────────────────────┐
│ ☐ Structured Information File Generator              ─ ☐    │
├─────────────────────────────────────────────────────────────┤
│ Submit SIF to Knowledgebase  Show Comm. Record  Show Setup  FAQ  Feedback │
│                                                             │
│ Product           61    63      Title         62            │
│ ┌──────────────┐                ┌──────────────────────────┐│
│ │ XYZ Software │        68─     │ XYZ Software fails with error: 0x299792458 ││
│ └──────────────┘                └──────────────────────────┘│
│ KB Document Type        70      Abstract                    │
│ ┌──────────────┐                ┌──────────────────────────┐│
│ │ KB: FAQs     │                │                          ││
│ │ KB: Troubleshoot │            │                          ││
│ └──────────────┘                └──────────────────────────┘│
│                                                             │
│ Platform(s)             64      Symptom                     │
│ ┌──────────────┐        72      ┌──────────────────────────┐│
│ │ AIX          │                │                          ││
│ │ HP-UX        │                │                          ││
│ │ Linux        │                │                          ││
│ │ Solaris      │                └──────────────────────────┘│
│ │ Windows      │                                            │
│ └──────────────┘                Cause                       │
│                                 ┌──────────────────────────┐│
│ Version(s)              66      │                          ││
│ ┌──────────────┐                │                          ││
│ │ 3.1.4.1      │                └──────────────────────────┘│
│ │ 3.1.4.0      │                                            │
│ │ 3.1.3.3      │                Environment                 │
│ │ 3.1.3.2      │                ┌──────────────────────────┐│
│ │ 3.1.3.1      │                │                          ││
│ └──────────────┘                │                          ││
│                                 └──────────────────────────┘│
│ Component                                                   │
│ ┌──────────────┐                Diagnosing The Problem      │
│ └──────────────┘                ┌──────────────────────────┐│
│                                 │                          ││
│ Defects                         │                          ││
│ ┌──────────────┐                └──────────────────────────┘│
│ │ ABC4567890   │                                            │
│ └──────────────┘                                            │
│ Tasks                           Resolving The Problem       │
│ ┌──────────────┐                ┌──────────────────────────┐│
│ │ Troubleshoot │                │                          ││
│ │ Use          │                │                          ││
│ └──────────────┘                └──────────────────────────┘│
│ Topics                                                      │
│ ┌──────────────┐                                            │
│ │ Connectivity │        74      Additional Keywords         │
│ │ Diagnostic   │                ┌──────────────────────────┐│
│ │ Documentation│                └──────────────────────────┘│
│ └──────────────┘                                            │
└─────────────────────────────────────────────────────────────┘

FIG. 5

AUTOMATION-ASSISTED CURATION OF TECHNICAL SUPPORT INFORMATION

TECHNICAL FIELD

The disclosure relates to technical support information, and in particular, to organizing information generated in technical support ticketing systems.

BACKGROUND

A technical support system may provide automated tools for managing and responding to technical support issues. Users and technical support personnel may use a technical support managing tool to report and work on resolving any of a variety of technical support issues across a range of software products or other technology products. Individual technical support tickets and efforts made to address technical support issues generate useful information in the context of those particular issues for the people working to resolve them.

SUMMARY

A system is disclosed herein for automation-assisted curation of technical information from technical support tickets into a technical information knowledge base. The system automatically maps information from technical support tickets in a technical support tool into corresponding fields of structured information files that may be stored in a structured information database or other technical support information data store, for example, and provides tools to facilitate or partly automate further manual curation of the content from the technical support tickets in the structured information files. This system may enable information from a technical support ticket collection to be assembled in a much more organized and useful form than fully automatic systems are capable of, while enabling a curator to assemble and organize information more rapidly and easily than by simply manually curating the information. The structured information files may be saved to and collected in a technical information knowledge base that assembles the collected information generated in the technical support tool. That knowledge base can be exposed to end users, allowing them to solve their own problems, or may be consumed internally by a technical support team to help them solve future support tickets.

In one example, a method using one or more processors includes mapping information from a plurality of fields of a support ticket in a technical support reporting tool to a plurality of corresponding fields of a structured information file. The method further includes using one or more processors, rendering the structured information file in a user-editable format in a user interface. The method further includes using one or more processors, saving user inputs to the structured information file, thereby generating a curated structured information file that incorporates the mapped information and the user inputs. The method further includes using one or more processors, saving the curated structured information file to a searchable technical support information data store.

In another example, a computing system includes one or more processors and one or more computer-readable tangible data storage devices. The computing system further includes program instructions, stored on at least one of the one or more computer-readable tangible data storage devices, to map information from a plurality of fields of a support ticket in a technical support reporting tool to a plurality of corresponding fields of a structured information file. The computing system further includes program instructions, stored on at least one of the one or more computer-readable tangible data storage devices, to render the structured information file in a user-editable format in a user interface. The computing system further includes program instructions, stored on at least one of the one or more computer-readable tangible data storage devices, to save user inputs to the structured information file, thereby generating a curated structured information file that incorporates the mapped information and the user inputs. The computing system further includes program instructions, stored on at least one of the one or more computer-readable tangible data storage devices, to save the structured information file to a searchable technical support information data store.

In another example, a computer program product includes one or more computer-readable tangible data storage media and program instructions stored on at least one of the one or more computer-readable tangible storage media. The computer program product includes program instructions, stored on at least one of the one or more computer-readable tangible data storage media, to map information from a plurality of fields of a support ticket in a technical support reporting tool to a plurality of corresponding fields of a structured information file. The computer program product further includes program instructions, stored on at least one of the one or more computer-readable tangible data storage media, to render the structured information file in a user-editable format in a user interface. The computer program product further includes program instructions, stored on at least one of the one or more computer-readable tangible data storage media, to save user inputs to the structured information file, thereby generating a curated structured information file that incorporates the mapped information and the user inputs. The computer program product further includes program instructions, stored on at least one of the one or more computer-readable tangible data storage media, to save the structured information file to a searchable technical support information data store.

The details of one or more embodiments are set forth in the accompanying drawings and the description below. Other features, objects, and advantages will be apparent from the description and drawings, and from the claims.

BRIEF DESCRIPTION OF THE DRAWINGS

FIG. 5 depicts a screenshot of a representative graphical user interface window of a structured information file generating system for automation-assisted curation of information from the technical support ticket into a structured information file for entry into a categorized technical support knowledge base.

DETAILED DESCRIPTION

Examples of a method, computing system, and computer program product for an automation-assisted technical support information curation system are set forth herein. Various embodiments of an automation-assisted technical support information curation system disclosed herein may facilitate and partly automate curation of content from the technical support tickets into structured information files for a technical information knowledge base, among various other features and advantages. Various illustrative features and advantages of an automation-assisted technical support information curation system are further described below, in illustrative and entirely non-limiting examples, with reference to FIGS. 1-8.

Figure 1:
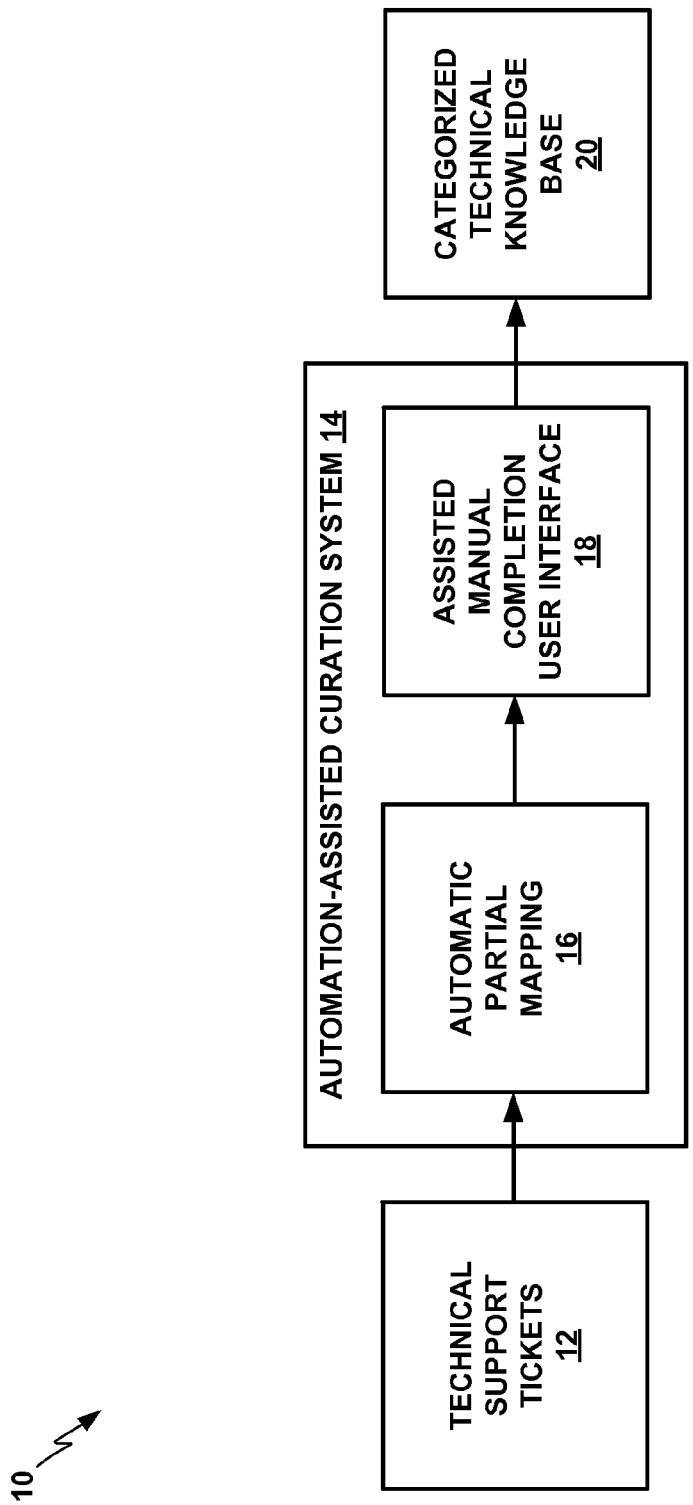
FIG. 1 is a block diagram of an example computing environment configured for automation-assisted curation of information from technical support tickets into a categorized technical support knowledge base.

FIG. 1 is a block diagram of an example computing environment 10 configured for automation-assisted curation system 14 to enable automation-assisted curation of information from technical support tickets 12 in a technical support reporting tool into a categorized technical support knowledge base 20, according to one example. Automation-assisted curation system 14 includes an automatic partial mapping component 16 that performs automatic initial mapping of partial information from a technical support ticket 12 into a structured information file. Automation-assisted curation system 10 further includes an assisted manual completion user interface 18 that provides tools and features to facilitate or partially automate a process of manually curating information from the technical support ticket 12 and potentially additional information for the structured information file. Assisted manual completion user interface 18 also includes functionality for a user, once curation is complete, to save the structured information file to a searchable information data store such as categorized technical support knowledge base 20. Assisted manual completion user interface 18 may include functionality to use information from the structured information file to organize or categorize it in technical support knowledge base 20 and facilitate its discoverability for searching or through hierarchical menus, for example. An example implementation of computing environment 10 and automation-assisted curation system 14 are further described as follows with reference to FIG. 2.

Figure 2:
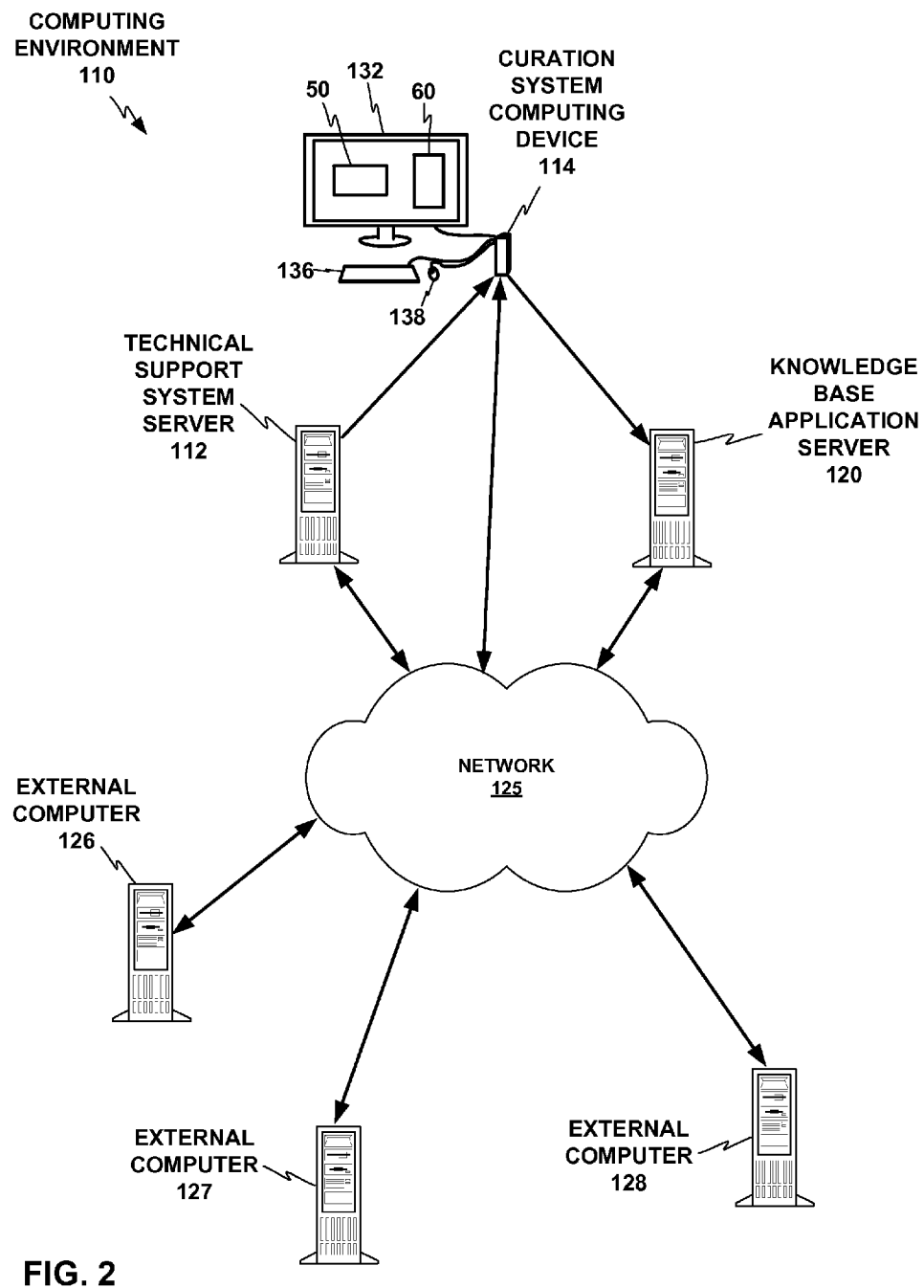
FIG. 2 is a schematic diagram of an example computing environment configured for automation-assisted curation of information from technical support tickets into a categorized technical support knowledge base.

FIG. 2 is a schematic diagram of an example computing environment 110 as one example implementation in which an automation-assisted curation system 14 as shown in FIG. 1 may be implemented. In particular, automation-assisted curation system 14 shown in FIG. 1 may be implemented in a system that runs on curation system computing device 114. Example computing environment 110 also includes technical support system server 112 and knowledge base application server 120. In this example, technical support system server 112 runs a technical support reporting tool for generating and managing technical support tickets 12 shown in FIG. 1, and knowledge base application server 120 hosts categorized technical support knowledge base 20 shown in FIG. 1. In this example, curation system computing device 114 enables automation-assisted curation of information from technical support tickets from a technical support reporting tool running on technical support system server 112 into a categorized technical support knowledge base or other type of searchable information data store hosted on knowledge base application server 120. A categorized technical support knowledge base is an example of a searchable information data store, and knowledge base application server 120 is an example of implementing a searchable information data store that includes structured information files generated with automation-assisted curation system 14.

Curation system computing device 122 may have user input/output components connected to it such as monitor 132, keyboard 136, and mouse 138, as in the example shown in FIG. 2. Other implementations may include an automation-assisted curation system 14 running on other forms of client computing devices including smartphones, notebook computers, laptop computers, or other mobile devices that have a touchscreen or keyboard, touchpad, and monitor incorporated therein, for example. In the example of FIG. 2, technical support system server 112 and knowledge base application server 120 are both communicatively connected via network 125, which may take the form of the Internet, to representative external computers 126, 127, 128 ("external computers 126-128"). Technical support system server 112, curation system computing device 114, and knowledge base application server 120 are also shown with communicative connections, that may be internal to an enterprise, for example, and that may take the form of a local area network (LAN), a virtual private network (VPN), or the Internet, for example.

A technical support reporting tool running on technical support system server 112 may receive and manage technical support tickets and communications associated with the technical support tickets among users and technical support personnel using any of representative external computers 126-128 or other computing devices beyond those shown in FIG. 2 that are capable of connecting over any type of hard-line or wireless network connection to technical support system server 112. While technical support system server 112 is representatively depicted as an individual server in FIG. 2, the technical support reporting tool may also run on any of a variety of configurations in other implementations, including on multiple servers, on one or more virtual servers, on one or more real or virtual servers of a remote data center or cloud-based web data service, or other operating environment implementations.

The technical support reporting tool running on technical support system server 112 or other operating environment may also maintain and manage a potentially large collection of technical support tickets and communications associated with particular technical support tickets, such as chat files, emails, or other text-based communications among users and technical support personnel. The technical support reporting tool may make use of any of a variety of any of a variety of data storage hardware and software for storing and managing this potentially large collection of technical support tickets and associated communication records, potentially including any type of database or other data storage and organization software, and any type of internal or external disc drives, flash drives, cache memory, redundant array of independent discs (RAID), storage area network (SAN), network drive or network version control, or other form of distributed storage, or other electronic, magnetic, or other type of data storage hardware, software, network, or service.

Knowledge base application server 120 may host a technical information knowledge base, which may in general refer to any type of collection of information about any type of software, hardware, service, system, engineering or scientific application, or any type of technology or other field of technical information. A technical information knowledge base hosted on knowledge base application server 120 may be particularly designed or intended for an audience of users of any of a variety of software products or services, other computing applications, or other types of technologies or operating contexts that may involve problem solving or troubleshooting, or in which users tend to have a recurring need to acquire new information. Curation system computing device 114 may be used to create and assemble a new technical information knowledge base, or to enhance or add to a pre-existing technical information knowledge base.

A technical information knowledge base hosted on knowledge base application server 120 may be made available to a wide audience of users, such as through network 125 to users of representative external computers 126-128 or to any other users with other computing devices beyond those shown in FIG. 2 that are capable of connecting over any type of hard-line or wireless network connection to technical support system server 112. A technical information knowledge base hosted on knowledge base application server 120 may be published online and made available to all users of the Internet, or may be restricted through any type of password system or user authentication system for subscribers or for members of an organization, in various examples. While knowledge base application server 120 is representatively depicted as an individual server in FIG. 2, a technical information knowledge base may also run on any of a variety of configurations in other implementations, including on multiple servers, on one or more virtual servers, on one or more real or virtual servers of a remote data center or cloud-based web data service, or other operating environment implementations.

The technical information knowledge base running on knowledge base application server 120 or other operating environment may also maintain and manage a potentially large collection of units of organized information such as structured information files in any form, such as database files, XML files, HTML web pages, a publishable document format such as portable document format (PDF) or any other type of document files, or any other form. The technical information knowledge base may also maintain any of various types of organizing information for organizing the structured information files or other units of information, such as a nested hierarchy in which the structured information files are organized and that may be rendered in corresponding nested hierarchical menus or indexes, or a search index in which any of various standardized fields are organized or indexed for search. The technical support reporting tool may make use of any of a variety of any of a variety of data storage hardware and software for storing and managing this potentially large collection of technical support tickets and associated communication records, potentially including any type of database or other data storage and organization software, and any type of internal or external disc drives, flash drives, cache memory, redundant array of independent discs (RAID), storage area network (SAN), network drive or network version control, or other form of distributed storage, or other electronic, magnetic, or other type of data storage hardware, software, network, or service.

Curation system computing device 114 is labeled as such in FIG. 2 because it runs an application that implements automation-assisted curation system 14 as shown in FIG. 1. Curation system computing device 114 is depicted as a desktop computer in FIG. 2 but may take the form of any type of computing device capable of executing an application, such as a laptop or notebook computer, a smartphone or other mobile device, a desktop computer, a server, or any other type of computing device. Curation system computing device 114 as depicted in FIG. 2 is associated with an illustrative personal computing environment that also includes user input devices in the form of keyboard 136, mouse 138, and monitor 132.

Curation system computing device 114 may run applications such as a technical support reporting tool application that interfaces with technical support system server 112, and an automation-assisted curation application that implements automation-assisted curation system 14 shown in FIG. 1. These applications running on curation system computing device 114 may be browser-based client interfaces with web applications, or desktop or other device-specific applications, and that may have graphical user interfaces (GUIs) or other types of user interfaces (UIs) such as example GUI windows 50, 60 (further described below) rendered on monitor 132. GUI window 50 may be a technical support reporting tool user interface for the technical support reporting tool application, and GUI window 60 may be an automation-assisted curation system user interface for an automation-assisted curation system 14. Curation system computing device 114 is depicted with communicative connections to technical support system server 112 and knowledge base application server 120, with communicative connections that may be implemented as LAN connections, Internet connections, VPN connections, direct USB connections, direct wireless connections, or any other type of communicative connections. In one example, curation system computing device 114 may run a desktop automation-assisted curation application that implements automation-assisted curation system 14 and that renders automation-assisted curation system GUI window 60, and that may be downloaded over a network connection or loaded from any type of storage medium. In another example, curation system computing device 114 may run a web browser of any type and receive web application data for an automation-assisted curation web application running on a separate server (not shown in FIG. 2), such that the web browser renders automation-assisted curation system GUI window 60 or provides a runtime for an automation-assisted curation client application. In various examples, a web application implementation or a desktop application implementation of automation-assisted curation system 14 or features thereof may be written in Java, JavaScript, C, C++, C#, Smalltalk, Ada, Common Lisp, Python, Ruby, Scala, Clojure, or any other language.

Making reference to features depicted in both FIGS. 1 and 2, various examples of implementing an automation-assisted curation system 14 of FIG. 1 or a user interface for an automation-assisted curation system on curation system computing device 114 may facilitate quickly and accurately creating reusable and rediscoverable knowledge from technical support tickets 12 from a customer relationship management (CRM) or other technical support system. An automation-assisted curation system 14 may enable substantial amounts of quality content to be rapidly created from technical support tickets 12 and assembled into categorized technical support knowledge base 20. Automation-assisted curation system 14 combines some aspects of automatically mapping information from technical support tickets 12, with automation-assisted manual curation of other aspects, to achieve higher-quality and more organized content than would be possible with a completely automatic mapping from technical support tickets 12 into a knowledge base 20, but that enables much easier and more rapid collection of information from technical support tickets 12 into a knowledge base 20 than would be possible by simply manually curating the information.

In one example, the automatic partial mapping component 16 may make use of a database of mappings from one or more selected standard fields in the technical support tickets 12 to corresponding fields in a structured information file, so that curation system 14 may refer to this mapping database to automatically detect where relevant content from a technical support ticket 12 should be entered in a structured information file. The automatic partial mapping component 16 may also reuse attributes collected throughout a support ticket 12 from a user beyond a particular subject or product with which the particular support ticket 12 is associated. Automation-assisted curation system 14 may thereby lower the difficulty and increase the efficiency in creating valuable technical content in the structured information file that may be particularly useful for technical troubleshooting and problem solving. The structured information file may be added to knowledge base 20, which may be published online as a web help content resource, for example. In the description for the remaining figures, various examples of automation-assisted curation system 14 as described above with reference to FIGS. 1 and 2 may be referred to simply as curation system 14, with the understanding that curation system 14 may refer to any application, feature, system, or other embodiment of an automation-assisted curation system 14 of this disclosure.

Figure 3:
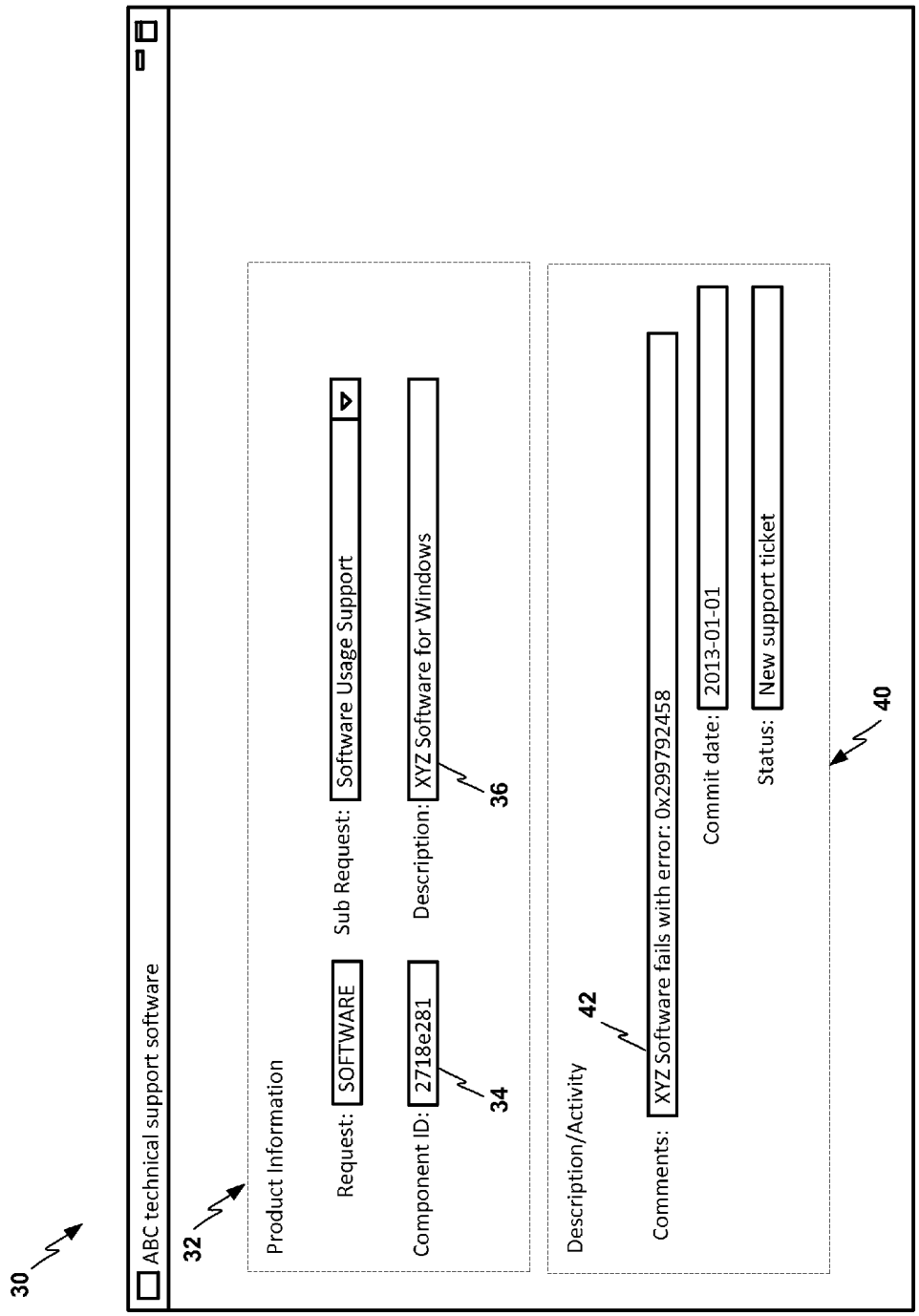
FIG. 3 depicts a screenshot of a representative graphical user interface window of a technical support ticket in a technical support reporting tool.

FIG. 3 depicts a screenshot of a representative graphical user interface (GUI) window of a technical support ticket 30 that may be rendered in a technical support reporting tool GUI 50 on a monitor 132 for curation system computing device 114 as depicted in FIG. 2. Technical support ticket 30 and the GUI window for technical support ticket 30 may both be referred to as technical support ticket 30. Technical support ticket 30 includes a product information section 32 that shows a component ID field 34 and a description field 36 that shows at least partial information that corresponds to the component ID shown in the component ID field 34. Technical support ticket 30 also shows a description section 40 with a representative comment field 42. Technical support ticket 30 as depicted in FIG. 3 may be a simplified representation of a technical support ticket that may include additional information in various implementations. Component ID field 34 shows a product serial number or other identifier that identifies what product or other type of subject a user for which a user sought assistance in connection with the technical support ticket 30.

Figure 4:
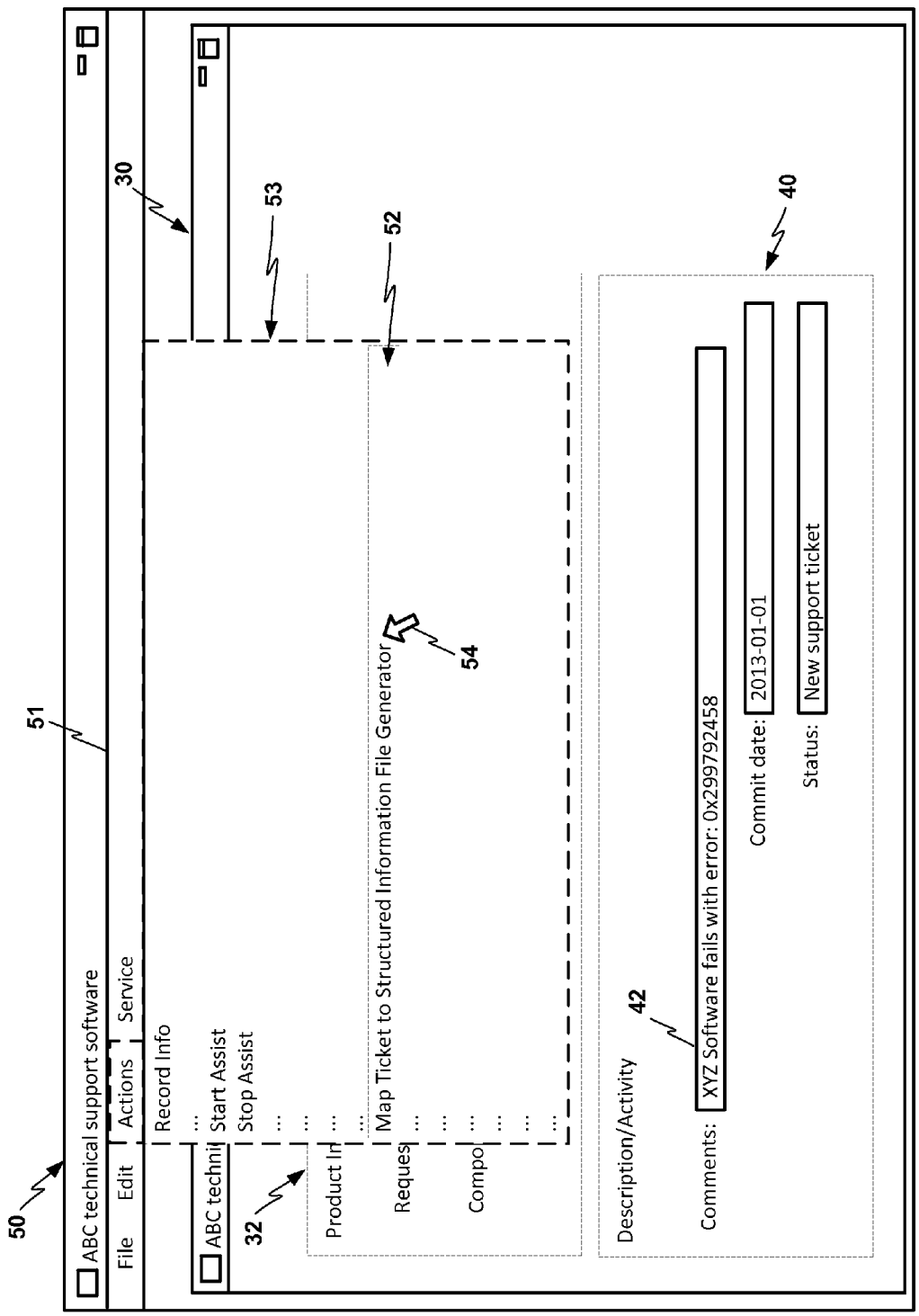
FIG. 4 depicts a screenshot of a representative graphical user interface window of a technical support reporting tool showing a technical support ticket and a menu action to begin automation-assisted curation of information from the technical support ticket into a structured information file for entry into a categorized technical support knowledge base.

FIG. 4 depicts a screenshot of a representative technical support reporting tool graphical user interface (GUI) window 50, as depicted on monitor 132 of curation system computing device 114 as shown in FIG. 2. Technical support reporting tool graphical user interface (GUI) window 50 shows displays technical support ticket 30 as depicted in FIG. 3, as well as a menu bar 51. Technical support reporting tool graphical user interface (GUI) window 50 may also include other features in various implementations. The depiction of FIG. 4 shows technical support reporting tool graphical user interface (GUI) window 50 responding to user interaction corresponding to a user selecting an "actions" menu 53 (in a simplified depiction) on menu bar 51 and hovering a cursor 54 on a menu item 52 labeled "Map Ticket to Structured Information File Generator". An automation-assisted curation system 14 may have injected menu item 52 as part of a macro, plug-in, or add-on to a pre-existing technical support reporting tool, for example. Technical support reporting tool graphical user interface (GUI) window 50 also shows product information section 32, description section 40, and representative comment field 42 as shown in FIG. 3, except for product information section 32 being partially obscured by the actions menu 53.

User selection of this menu item 52 may be used to invoke or call an automation-assisted curation program or other form of the curation system 14 as shown in FIG. 1 and which may for example run on curation system computing device 114 of FIG. 2, as discussed above. Selection of menu item 52 may initiate a process of curation system 14 performing an automation-assisted curation of the information in support ticket 30, including both automatic partial mapping of information from fields of support ticket 30 to a structured information file, and initiation of an interface for automation-assisted manual curation of the structured information file, for eventual entry into a searchable information data store such as a categorized technical support knowledge base.

FIG. 5 depicts a screenshot of a representative structured information file GUI window 60 of a curation system 14 such as may be implemented by an automation-assisted curation program running on curation system computing device 114 depicted in FIG. 2. The underlying structured information file represented by structured information file GUI window 60 may also colloquially be referred to herein as structured information file 60, with the understanding of the distinction between the file and the GUI window in which a representation of the file is rendered. Structured information file GUI window 60 corresponds to GUI window 60 rendered side-by-side with support ticket 30 on monitor 132 of curation system computing device 114 in the example environment depicted in FIG. 2. A user of curation system computing device 114 as shown in FIG. 2 may, as one illustrative usage context, have support ticket 30 and structured information file GUI window 60 both open during the process of automation-assisted curation of information from support ticket 30 to structured information file GUI window 60. Structured information file GUI window 60 shows some information that the automation-assisted curation program has automatically mapped from support ticket 30 into a new structured information file represented by structured information file GUI window 60. Structured information file GUI window 60 also provides features that may be used for automation-assisted manual curation of further information from the technical support ticket 30, or from original user input or other sources, into the structured information file represented by structured information file GUI window 60, and ultimately for entry into a categorized technical support knowledge base 20.

The automation-assisted curating system may use the component ID 34 from support ticket 30, as shown in FIG. 3, as a lookup key in a related database which contains mappings of component IDs to products or other technical support ticket subjects, and that may specify how help content should be categorized in the technical information knowledge base 20. In this example, the curation system 14 discovers in the mapping database that the component ID 2718e281 maps to a specific version of the product "XYZ Software", and automatically maps product and version details indicated by the component ID from its mapping database to structured information file GUI window 60. Curation system 14 may also map product and version details from fields it recognizes as such that are provided in support ticket 30. These fields in structured information file GUI window 60 as shown in FIG. 5 that have information automatically mapped by curation system 14 include a product or subject identification field 63, a field 64 showing a specific platform of the product, and a field 66 showing a specific version of the product. The curation system 14 may map the platform and version information, or other product or version details, from its mapping database based on the component ID from the support ticket 30, or directly from support ticket 30 if provided there in a recognizable format. In the absence of this automation, a user would have to navigate a complex hierarchical menu to manually associate a new knowledge base document with the correct product, including the correct platform and version.

The curation system 14 may also provide automation-assisted features, in addition to fully automatic features. For example, the curation system 14 may automatically extrapolate other elements of information from support ticket 30, such as a suggested title for the new structured information file 60, as shown in title field 68 in FIG. 5, based on a relevant field in the technical support ticket 30, such as comments field 42 as shown in FIGS. 3 and 4. Technical support ticket 30 may also include a larger field or multiple fields labeled "comments", and curation system 14 may for example select an initial portion or initial line from the comments field, or use techniques of text analysis or pattern recognition to select or combine portions of a comments field and/or other fields from technical support ticket 30 to enter to title field 68 of structured information file 60. The curation system 14 may use similar methods or techniques to select other information from various fields of support ticket 30 to enter as initial entries to other fields of structured information file 60 such as abstract field 70, symptom field 72, and additional keywords field 74, which in particular may be used for indexing keywords in structured search indexes in the technical information knowledge base 20. The curation system 14 may also scan fields of communication records that are associated with a particular support ticket 30, and similarly select from among text from the associated communication records to enter as initial entries to various fields of structured information file 60.

The curation system 14 may also extrapolate the platform as identified in platform field 64 if that information is not explicitly represented from a component ID in the mapping database or from a corresponding field of the support ticket 30. For example, if the curation system 14 finds that there is no platform identified from a component ID in the mapping database or from a corresponding field of the support ticket 30, curation system 14 may then scan other fields of support ticket 30 such as comments fields or associated communication records, and compare the text with candidates for the platform. For example, if the component ID or support ticket do not unambiguously indicate an applicable platform, the curation system 14 may scan the comments fields or communication records and compare their content with likely candidates. For example, if curation system 14 finds that the comments fields and/or associated communication records for a support ticket 30 include one or more mentions of the text string "AIX" and no occurrences of other candidates, curation system 14 may automatically make an initial selection of AIX as the platform in platform field 64 of structured information file 60.

Structured information file GUI window 60 (as distinguished from the structured information file itself) also includes menu item 62 to show the communication records associated with the support ticket 30, and menu item 61 to submit the current structured information file to knowledge base 20. While curation system 14 may populate some of the fields of structured information file 60 automatically and may make automatic initial entries to one or more fields of structured information file 60, the structured information file GUI window 60 also leaves many or all of its fields user-editable, so a user may make edits prior to selecting menu item 61 to submit the current structured information file to knowledge base 20. Curation system 14 may also provide additional automation-assisted curation features as described below with reference to FIG. 6.

Figure 6:
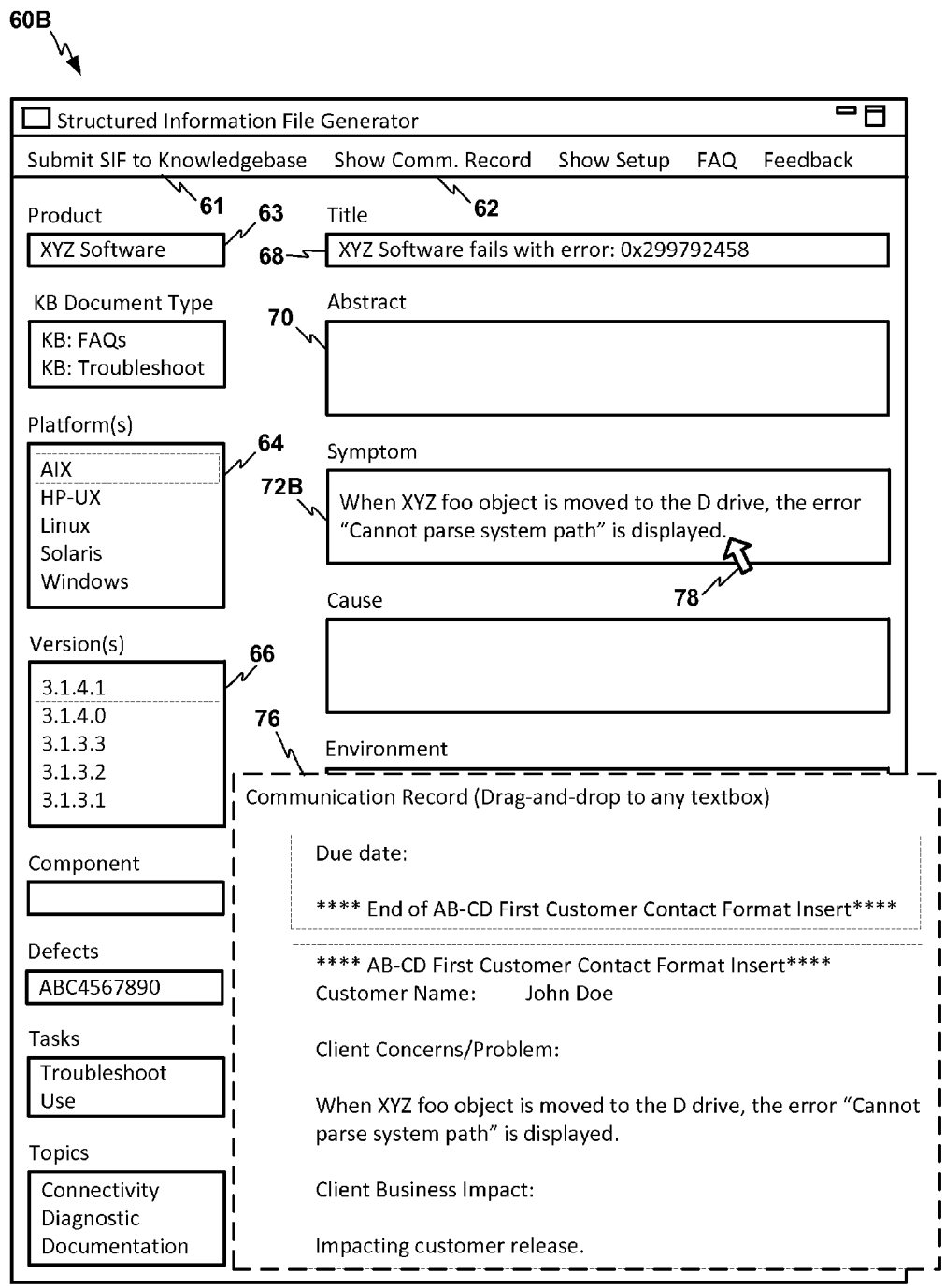
FIG. 6 depicts a screenshot of a representative graphical user interface window of a structured information file generating system with additional features for automation-assisted curation of information from the technical support ticket into a structured information file for entry into a categorized technical support knowledge base.

FIG. 6 depicts a screenshot of a representative graphical user interface window 60B of a structured information file generating system, i.e. a rendering of a different state of structured information file GUI window 60 of FIG. 5, with additional features for automation-assisted curation of information from the technical support ticket 30 into the corresponding structured information file. Structured information file GUI window 60B shows a rendering after a user has selected menu item 62 and opened an associated communication record portion 76. Structured information file GUI window 60B may provide a native capability to open portions of the support ticket 30, associated communication records 76, or other associated information, and to drag-and-drop or otherwise easily select and insert portions of information from support ticket 30, associated communication records 76, or other associated information into the fields of the structured information file. In the example depicted in FIG. 6, curation system 14 recognizes and sections portions of communication record 76 into selectable portions made available for the user to drag-and-drop from communication records 76 into fields of the structured information file GUI window 60B. As is depicted in FIG. 6, a user has selected a portion of text from associated communication record 76 and, manipulating cursor 78, has dropped the portion of text into "symptom" field 72B.

Curation system 14, including structured information file GUI window 60B, may thereby provide some features that are automation-assisted and facilitated for further selection, insertion, and other curating operations performed manually by a user. For example, curation system 14 may render one or more of the fields from the support ticket 30 in the user interface 60 and provide a drag-and-drop function from the fields of the support ticket 30 to the fields of the structured information file in the user interface 60. Curation system 14 may also render one or more fields of a communication record 76 associated with the support ticket 30 in the user interface 60B, and provide a drag-and-drop function from the fields of the communication record 76 to the fields of the structured information file in the user interface 60B. Curation system 14 may also read a subject identifier from a subject identifier field 42 in the support ticket 30, and categorize the structured information file 60 in the knowledge base 20 or other searchable information data store in accordance with the subject identifier. The subject identifier may be a product identifier that identifies a product with which the support ticket 30 is associated, and the structured information file may be categorized in association with the product in the searchable information data store. Curation system 14 may also use the subject identifier as a lookup key in a database of mappings from subject identifiers to categorizations for the searchable information data store.

Curation system 14 may also be configured to automatically exclude or remove any private, sensitive, or irrelevant data from the support ticket in the process of generating the corresponding structured information file, to ensure that the information added to the structured information file is appropriate for public availability and consumption. For example, a support ticket may include stack traces specific to a particular client's code. A support ticket may also include file names, document text, or spreadsheet data particular to a given client, or names or contact information of particular individuals. Curation system 14 may avoid taking data from fields identified with private or sensitive data, use search keys or pattern recognition techniques to identify and remove private or sensitive data from blocks of text before they are mapped into the structured information file, or use other techniques for preventing private data from being included in the structured information file, prior to publishing the structured information file in a searchable technical support information data store on a network. A user of curation system 14 curating information from a support ticket may also manually select only relevant and non-sensitive information in the drag-and-drop interface illustratively shown in FIG. 6, while omitting material such as stack traces. Curation system 14 may also, for example, include reminders, flags, or automatic partitioning of drag-and-drop content, to assist the curating user in selecting only appropriate information to include in the structured information file.

Curation system 14 may also map a defect number from support ticket 30 to structured information file 60 if there is one. Curation system 14 may also automatically add a help note number from support ticket 30 to structured information file 60 if there is one that may provide access to a help note process in the technical support reporting tool, that may provide further information to subsequent users of the structured information file in the knowledge base. Once the user is finished editing structured information file 60 and selects menu item 61, curation system 14 may submit the current structured information file to the knowledge base 20, which may be published online as a searchable information data store and which subsequent users may turn to as a valuable resource for help content, troubleshooting, and problem solving, for example. Curation system 14 may thereby help convert all the information generated in specific cases in a technical support reporting system into knowledge that is made generally available for subsequent users.

Figure 7:
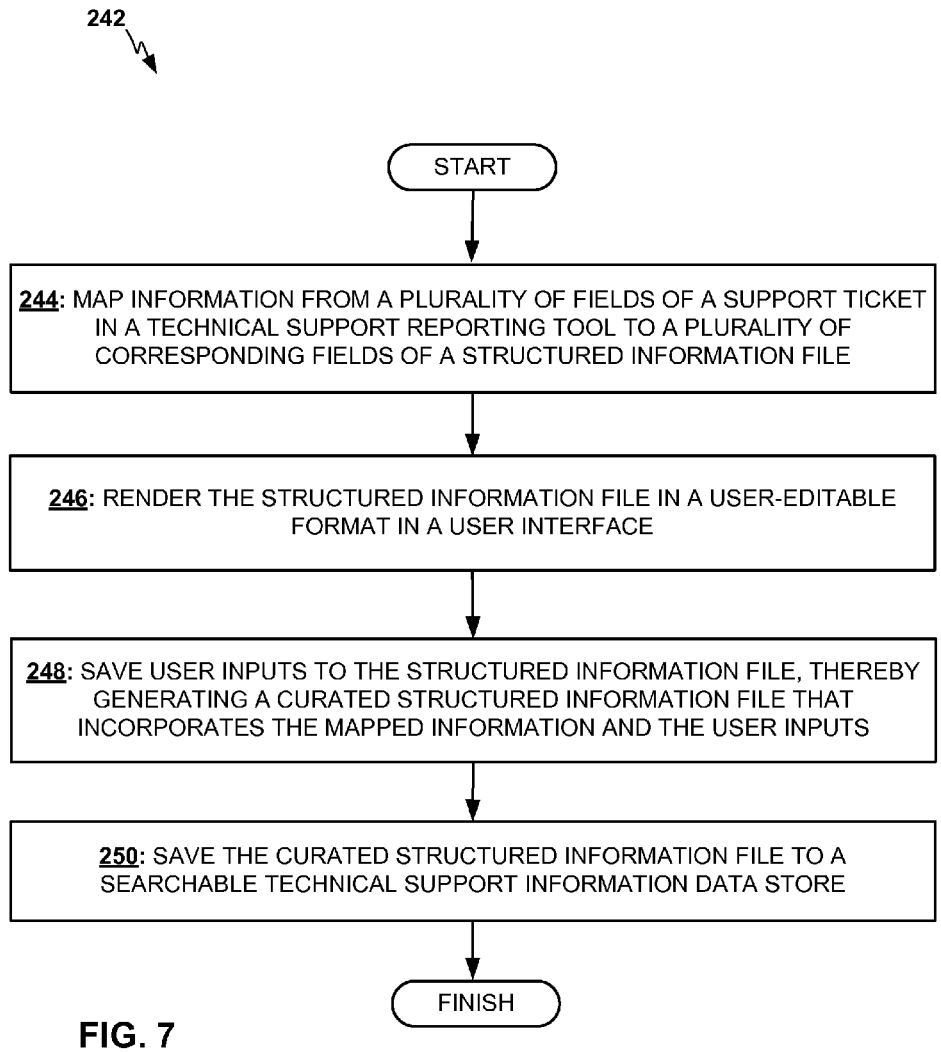
FIG. 7 is a flowchart illustrating operation of an example method for automation-assisted curation of information from technical support tickets into a categorized technical support knowledge base.

FIG. 7 is a flowchart illustrating operation of an example method 242 for automation-assisted curation of information from technical support tickets into a categorized technical support knowledge base, including by using one or more processors of at least one computing device, such as curation system computing device 114 depicted in and described with reference to FIG. 2. In this example, method 242 includes mapping information from a plurality of fields of a support ticket in a technical support reporting tool (244), such as support ticket 30 shown in FIGS. 3 and 4, to a plurality of corresponding fields of a structured information file, such as structured information file 60 depicted in FIGS. 5 and 6. In this example, method 242 further includes rendering the structured information file in a user-editable format in a user interface (246), such as the user-editable format in the GUI for structured information file 60 depicted in FIGS. 5 and 6. In this example, method 242 further includes receiving and saving user inputs to the structured information file, thereby generating a curated structured information file that incorporates the mapped information and the user inputs (248), such as is depicted and described with reference to the GUI for structured information file 60 depicted in FIG. 6. In this example, method 242 further includes saving the curated structured information file to a searchable technical support information data store (250), such as may be done when a user selects menu option 61 in the GUI for structured information file 60 depicted in FIGS. 5 and 6, and as systematically depicted in FIGS. 1 and 2, in which automation assisted curation system 14 may save a structured information file to categorized knowledge base 20, or curation system computing device 114 may save a structured information file to knowledge base application server 120, according to various examples.

Figure 8:
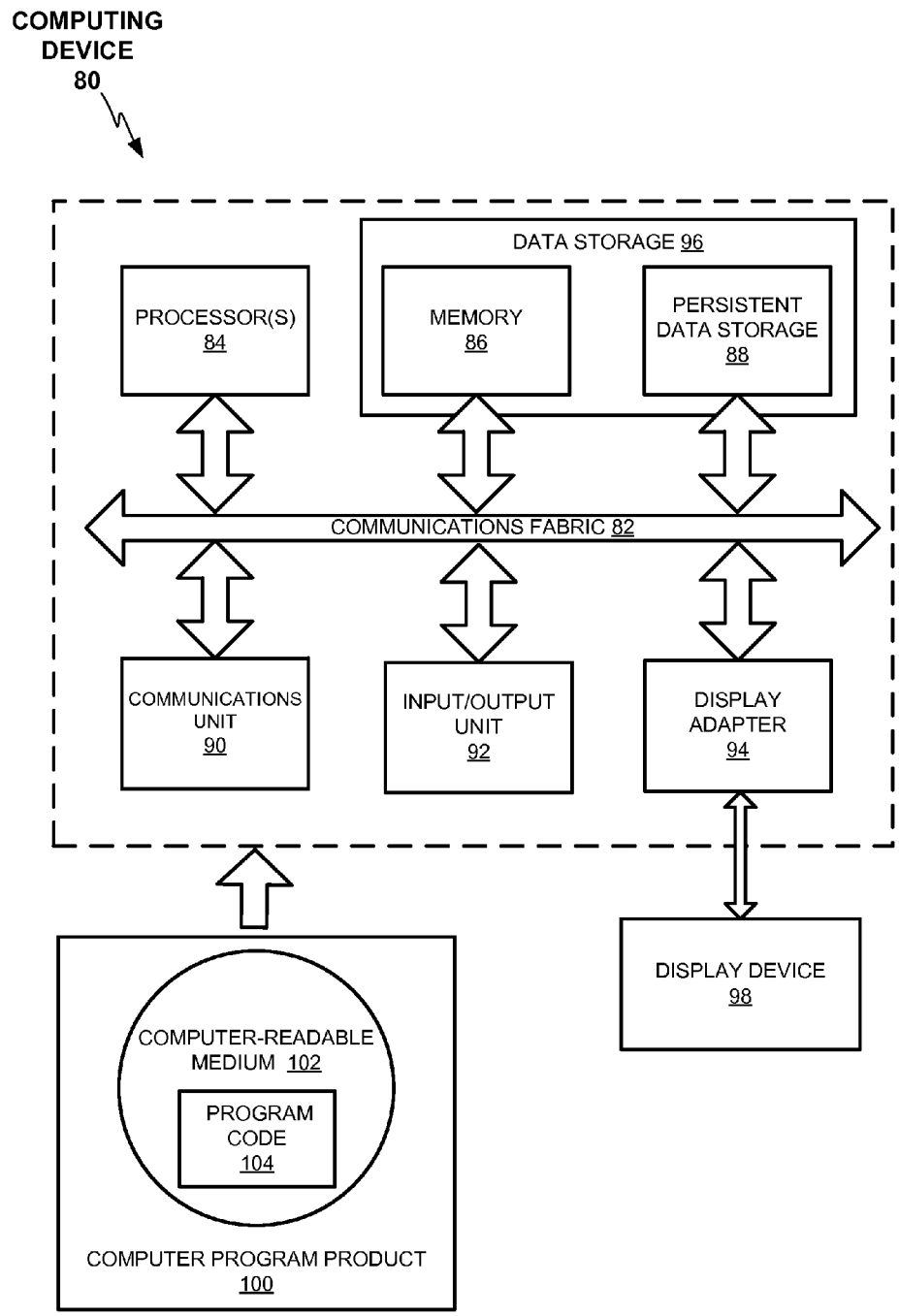
FIG. 8 is a block diagram of an example computing device that may be used for implementing all or part of a method of automation-assisted curation of information from technical support tickets into a categorized technical support knowledge base.

FIG. 8 is a block diagram of an example computing device 80 that may be used for implementing all or part of a method of automation-assisted curation of information from technical support tickets into a categorized technical support knowledge base, according to an illustrative example. Computing device 80 of FIG. 8 may represent curation system computing device 114 as depicted in FIG. 2, or technical support system server 112 or knowledge base application server 120 depicted in FIG. 2, for example. Any of curation system computing device 114, technical support system server 112, or knowledge base application server 120 of FIG. 2 may also be implemented as virtual machines or virtual servers that may execute on computing device 80 of FIG. 8 or on multiple computing devices that may include computing device 80 of FIG. 8, in different example implementations. Any one or more processor(s) 84 of computing device 80 may also perform all or any aspects or portions of method 242 described with reference to FIG. 7.

A system or method for automation-assisted curation of information from technical support tickets may be enabled either by incorporating this capability natively in an application, or adding it via a plug-in, add-on, or macro to another application, for example. Computing device 80 may be a workstation, server, mainframe computer, notebook or laptop computer, desktop computer, tablet, smartphone, feature phone, or other programmable data processing apparatus of any kind. Any combination or all of the processes and capabilities disclosed herein may execute on computing device 80 or a combination of similar computing devices, that may also be implemented in a data center or a cloud data service with multiple redundant data centers, or in any other configuration. Other possibilities for computing device 80 are possible, including a computer having capabilities or formats other than or beyond those described herein.

In this illustrative example, computing device 80 includes communications fabric 82, which provides communications between processor(s) 84, memory 86, persistent data storage 88, communications unit 90, and input/output (I/O) unit 92. Communications fabric 82 may include a dedicated system bus, a general system bus, multiple buses arranged in hierarchical form, any other type of bus, bus network, switch fabric, or other interconnection technology. Communications fabric 82 supports transfer of data, commands, and other information between various subsystems of computing device 80.

Processor(s) 84 may be a programmable central processing unit (CPU) configured for executing programmed instructions stored in memory 86. In another illustrative example, processor(s) 84 may be implemented using one or more heterogeneous processor systems in which a main processor is present with secondary processors on a single chip. In yet another illustrative example, processor(s) 84 may be a symmetric multi-processor system containing multiple processors of the same type. Processor(s) 84 may be a reduced instruction set computing (RISC) microprocessor such as a PowerPC® processor from IBM® Corporation, an x86 compatible processor such as a Pentium® processor from Intel® Corporation, an Athlon® processor from Advanced Micro Devices® Corporation, or any other suitable processor. In various examples, processor(s) 84 may include a multi-core processor, such as a dual core or quad core processor, for example. Processor(s) 84 may include multiple processing chips on one die, and/or multiple dies on one package or substrate, for example. Processor(s) 84 may also include one or more levels of integrated cache memory, for example. In various examples, processor(s) 84 may comprise one or more CPUs distributed across one or more locations.

Data storage 96 includes memory 86 and persistent data storage 88, which are in communication with processor(s) 84 through communications fabric 82. Memory 86 can include a random access semiconductor memory (RAM) for storing application data, i.e., computer program data, for processing. While memory 86 is depicted conceptually as a single monolithic entity, in various examples, memory 86 may be arranged in a hierarchy of caches and in other memory devices, in a single physical location, or distributed across a plurality of physical systems in various forms. While memory 86 is depicted physically separated from processor(s) 84 and other elements of computing device 80, memory 86 may refer equivalently to any intermediate or cache memory at any location throughout computing device 80, including cache memory proximate to or integrated with processor(s) 84 or individual cores of processor(s) 84.

Persistent data storage 88 may include one or more hard disc drives, solid state drives, flash drives, rewritable optical disc drives, magnetic tape drives, or any combination of these or other data storage media. Persistent data storage 88 may store computer-executable instructions or computer-readable program code for an operating system, application files comprising program code, data structures or data files, and any other type of data. These computer-executable instructions may be loaded from persistent data storage 88 into memory 86 to be read and executed by processor(s) 84 or other processors. Data storage 96 may also include any other hardware elements capable of storing information, such as, for example and without limitation, data, program code in functional form, and/or other suitable information, either on a temporary basis and/or a permanent basis.

Persistent data storage 88 and memory 86 are examples of physical, tangible, non-transitory computer-readable data storage devices. Data storage 96 may include any of various forms of volatile memory that may require being periodically electrically refreshed to maintain data in memory, but those skilled in the art will recognize that this also constitutes an example of a physical, tangible, non-transitory computer-readable data storage device. Executable instructions are stored on a non-transitory medium when program code is loaded, stored, relayed, buffered, or cached on a non-transitory physical medium or device, including if only for only a short duration or only in a volatile memory format.

Processor(s) 84 can also be suitably programmed to read, load, and execute computer-executable instructions or computer-readable program code for a dynamic property data integration framework, as described in greater detail above. This program code may be stored on memory 86, persistent data storage 88, or elsewhere in computing device 80. This program code may also take the form of program code 104 stored on computer-readable medium 102 comprised in computer program product 100, and may be transferred or communicated, through any of a variety of local or remote means, from computer program product 100 to computing device 80 to be enabled to be executed by processor(s) 84, as further explained below.

The operating system may provide functions such as device interface management, memory management, and multiple task management. The operating system can be a Unix based operating system such as the AIX® operating system from IBM® Corporation, a non-Unix based operating system such as the Windows® family of operating systems from Microsoft® Corporation, a network operating system such as JavaOS® from Oracle® Corporation, a mobile device operating system such as iOS® from Apple® Inc., or any other suitable operating system. Processor(s) 84 can be suitably programmed to read, load, and execute instructions of the operating system.

Communications unit 90, in this example, provides for communications with other computing or communications systems or devices. Communications unit 90 may provide communications through the use of physical and/or wireless communications links. Communications unit 90 may include a network interface card for interfacing with a LAN 16, an Ethernet adapter, a Token Ring adapter, a modem for connecting to a transmission system such as a telephone line, or any other type of communication interface. Communications unit 90 can be used for operationally connecting many types of peripheral computing devices to computing device 80, such as printers, bus adapters, and other computers. Communications unit 90 may be implemented as an expansion card or be built into a motherboard, for example.

The input/output unit 92 can support devices suited for input and output of data with other devices that may be connected to computing device 80, such as keyboard, a mouse or other pointer, a touchscreen interface, an interface for a printer or any other peripheral device, a removable magnetic or optical disc drive (including CD-ROM, DVD-ROM, or Blu-Ray), a universal serial bus (USB) receptacle, or any other type of input and/or output device. Input/output unit 92 may also include any type of interface for video output in any type of video output protocol and any type of monitor or other video display technology, in various examples. Some of these examples may overlap with each other, or with example components of communications unit 90 or data storage 96. Input/output unit 92 may also include appropriate device drivers for any type of external device, or such device drivers may reside in the operating system or elsewhere on computing device 80 as appropriate.

Computing device 80 also includes a display adapter 94 in this illustrative example, which provides one or more connections for one or more display devices, such as display device 98, which may include any of a variety of types of display devices, including monitor 132 of FIG. 2. Display adapter 94 may include one or more video cards, one or more graphics processing units (GPUs), one or more video-capable connection ports, or any other type of data connector capable of communicating video data, in various examples. Display device 98 may be any kind of video display device, such as a monitor, a television, or a projector, in various examples.

Input/output unit 92 may include a drive, socket, or outlet for receiving computer program product 100, which comprises a computer-readable medium 102 having computer program code 104 stored thereon. For example, computer program product 100 may be a CD-ROM, a DVD-ROM, a Blu-Ray disc, a magnetic disc, a USB stick, a flash drive, or an external hard disc drive, as illustrative examples, or any other suitable data storage technology. Computer program code 104 may include a dynamic property data integration framework computer program, module, or portion of code for providing a system for automation-assisted curation of information from technical support tickets to structured information files for a technical information knowledge base, as described above.

Computer-readable medium 102 may include any type of optical, magnetic, or other physical medium that physically encodes program code 104 as a binary series of different physical states in each unit of memory that, when read by computing device 80, induces a physical signal that is read by processor(s) 84 that corresponds to the physical states of the basic data storage elements of storage medium 102, and that induces corresponding changes in the physical state of processor(s) 84 That physical program code signal may be modeled or conceptualized as computer-readable instructions at any of various levels of abstraction, such as a high-level programming language, assembly language, or machine language, but ultimately constitutes a series of physical electrical and/or magnetic interactions that physically induce a change in the physical state of processor(s) 84, thereby physically causing processor(s) 84 to generate physical outputs that correspond to the computer-executable instructions, in a way that modifies computing device 80 into a new physical state and causes computing device 80 to physically assume new capabilities that it did not have until its physical state was changed by loading the executable instructions comprised in program code 104.

In some illustrative examples, program code 104 may be downloaded over a network to data storage 96 from another device or computer system, such as a server, for use within computing device 80. Program code 104 comprising computer-executable instructions may be communicated or transferred to computing device 80 from computer-readable medium 102 through a hard-line or wireless communications link to communications unit 90 and/or through a connection to input/output unit 92. Computer-readable medium 102 comprising program code 104 may be located at a separate or remote location from computing device 80, and may be located anywhere, including at any remote geographical location anywhere in the world, and may relay program code 104 to computing device 80 over any type of one or more communication links, such as the Internet and/or other packet data networks. The program code 104 may be transmitted over a wireless Internet connection, or over a shorter-range direct wireless connection such as wireless LAN, Bluetooth™, Wi-Fi™, or an infrared connection, for example. Any other wireless or remote communication protocol may also be used in other implementations.

The communications link and/or the connection may include wired and/or wireless connections in various illustrative examples, and program code 104 may be transmitted from a source computer-readable medium 102 over non-tangible media, such as communications links or wireless transmissions containing the program code 104. Program code 104 may be more or less temporarily or durably stored on any number of intermediate tangible, physical computer-readable devices and media, such as any number of physical buffers, caches, main memory, or data storage components of servers, gateways, network nodes, mobility management entities, or other network assets, en route from its original source medium to computing device 80.

As will be appreciated by one skilled in the art, aspects of the present invention may be embodied as a method, a computing system, or a computer program product, for example. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system", and that may perform or embody a method or a portion of a method.

Furthermore, aspects of the present invention may take the form of a computer program product embodied in one or more computer-readable data storage devices or computer-readable data storage components that include computer-readable medium(s) having computer readable program code embodied thereon. For example, a computer-readable data storage device may be embodied as a tangible device that may include a tangible, non-transitory data storage medium, as well as a controller configured for receiving instructions from a resource such as a central processing unit (CPU) to retrieve information stored at one or more particular addresses in the tangible, non-transitory data storage medium, and for retrieving and providing the information stored at those particular one or more addresses in the data storage medium.

The data storage device may store information that encodes both instructions and data, for example, and may retrieve and communicate information encoding instructions and/or data to other resources such as a CPU, for example. The data storage device may take the form of a main memory component such as a hard disc drive or a flash drive in various embodiments, for example. The data storage device may also take the form of another memory component such as a RAM integrated circuit or a buffer or a local cache in any of a variety of forms, in various embodiments. This may include a cache integrated with a controller, a cache integrated with a graphics processing unit (GPU), a cache integrated with a system bus, a cache integrated with a multi-chip die, a cache integrated within a CPU, or the processor registers within a CPU, as various illustrative examples. The data storage apparatus or data storage system may also take a distributed form such as a redundant array of independent discs (RAID) system or a cloud-based data storage service, and still be considered to be a data storage component or data storage system as a part of or a component of an embodiment of a system of the present disclosure, in various embodiments.

Any combination of one or more computer readable medium(s) may be utilized. The computer readable medium may be a computer readable signal medium or a computer readable storage medium. A computer readable storage medium may be, for example, but is not limited to, an electronic, magnetic, optical, electromagnetic, infrared, electro-optic, heat-assisted magnetic, or semiconductor system, apparatus, or device, or any suitable combination of the foregoing. A non-exhaustive list of additional specific examples of a computer readable storage medium includes the following: an electrical connection having one or more wires, a portable computer diskette, a hard disc, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device, for example.

Program code embodied on a computer readable medium may be transmitted using any appropriate medium, including but not limited to radio frequency (RF) or other wireless, wireline, optical fiber cable, etc., or any suitable combination of the foregoing. Computer program code for carrying out operations for aspects of the present invention may be written in any combination of one or more programming languages, including an object oriented programming language such as Java, Smalltalk, C++, Objective-C, or the like, or other imperative programming languages such as C, or functional languages such as Common Lisp, Haskell, or Clojure, or multi-paradigm languages such as C#, Python, Ruby, or Scala, among a variety of illustrative examples. One or more sets of applicable program code may execute partly or entirely on a user's desktop or laptop computer, smartphone, tablet, or other computing device; as a stand-alone software package, partly on the user's computing device and partly on a remote computing device; or entirely on one or more remote servers or other computing devices, among various examples. In the latter scenario, the remote computing device may be connected to the user's computing device through any type of network, including a local area network (LAN) or a wide area network (WAN), or the connection may be made to an external computer (for example, through a public network such as the Internet using an Internet Service Provider), and for which a virtual private network (VPN) may also optionally be used.

In various illustrative embodiments, various computer programs, software applications, modules, or other software elements may be executed in connection with one or more user interfaces being executed on a client computing device, that may also interact with one or more web server applications that may be running on one or more servers or other separate computing devices and may be executing or accessing other computer programs, software applications, modules, databases, data stores, or other software elements or data structures.

A graphical user interface may be executed on a client computing device and may access applications from the one or more web server applications, for example. Various content within a browser or dedicated application graphical user interface may be rendered or executed in or in association with the web browser using any combination of any release version of HTML, CSS, JavaScript, XML, AJAX, JSON, and various other languages or technologies. Other content may be provided by computer programs, software applications, modules, or other elements executed on the one or more web servers and written in any programming language and/or using or accessing any computer programs, software elements, data structures, or technologies, in various illustrative embodiments.

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided as computer-executable code to a processor of a general purpose computer, special purpose computer, or other programmable data processing apparatus to produce a machine, such that the instructions, which execute via the processor of the computer or other programmable data processing apparatus, may create means for implementing the functions or acts specified in the flowchart and/or block diagram block or blocks.

These computer program instructions may also be stored in a computer readable medium that can cause a computer, other programmable data processing apparatus, or other devices to function in a particular manner, such that the executable instructions stored in the computer readable medium transform the computing device into an article of manufacture that embodies or implements the functions or acts specified in the flowchart and/or block diagram block or blocks. The computer program instructions may also be loaded onto a computer, other programmable data processing apparatus, or other devices to cause a series of operational steps to be performed on the computer, other programmable apparatus or other devices, to produce a computer implemented process such that the instructions which execute on the computer or other programmable apparatus provide or embody processes for implementing the functions or acts specified in the flowchart and/or block diagram block or blocks.

The flowchart and block diagrams in the figures illustrate the architecture, functionality, and operation of possible implementations of devices, methods and computer program products according to various embodiments of the present disclosure. In this regard, each block in the flowchart or block diagrams may represent a module, segment, or portion of code, which includes one or more executable instructions for implementing the specified logical function(s). In some implementations, the functions noted in the block may occur out of the order noted in the figures. For example, two blocks shown in succession may, in fact, be executed substantially concurrently, or the blocks may be executed in a different order, or the functions in different blocks may be processed in different but parallel threads, depending upon the functionality involved. Each block of the block diagrams and/or flowchart illustration, and combinations of blocks in the block diagrams and/or flowchart illustration, may be implemented by special purpose hardware-based systems that perform the specified functions or acts, or in any combination of special purpose hardware and computer-executable instructions running on general purpose hardware.

The description of the present disclosure has been presented for purposes of illustration and description, and is not intended to be exhaustive or limited to the disclosure in the form disclosed. Many modifications and variations will be understood by persons of ordinary skill in the art based on the concepts disclosed herein. The particular examples described were chosen and disclosed in order to explain the principles of the disclosure and example practical applications, and to enable persons of ordinary skill in the art to understand the disclosure for various embodiments with various modifications as are suited to the particular use contemplated. The various examples described herein and other embodiments are within the scope of the following claims.

What is claimed is:

1. A method comprising:
   mapping, by one or more processors of a computing device, information from a plurality of fields of an electronic support ticket in a technical support reporting tool to a plurality of corresponding fields of a structured information file;
   rendering, by the one or more processors, the structured information file in a user-editable format in a user interface;
   rendering, by the one or more processors, a plurality of fields of a communication record associated with the electronic support ticket in the user interface, together with rendering the structured information file in the user-editable format in the user interface;
providing, by the one or more processors, a drag-and-drop function from the plurality of fields of the communication record to any of the plurality of fields of the structured information file in the user interface;
sectioning, by the one or more processors, portions of the communication record into selectable portions enabled for the drag-and-drop function from the plurality of fields of the communication record to the plurality of fields of the structured information file in the user interface;
detecting, by the one or more processors, a stack trace specific to code of a particular client in the support ticket;
removing, by the one or more processors, at least one of private or sensitive data from the support ticket in the structured information file, wherein the private or sensitive data comprise the stack trace specific to the particular client;
saving, by the one or more processors, user inputs to the plurality of fields of the structured information file, thereby generating a curated structured information file that incorporates the mapped information and the user inputs; and
saving, by the one or more processors, the curated structured information file to a searchable technical support information data store,
wherein removing the at least one of the private or sensitive data from the support ticket in the structured information file comprises automatically using search keys to identify and remove the at least one of the private or sensitive data from a block of text before the block of text is mapped into the structured information file.

2. The method of claim 1, further comprising reading a subject identifier from a subject identifier field in the support ticket, and categorizing the curated structured information file in the searchable technical support information data store in accordance with the subject identifier.

3. The method of claim 2, wherein the subject identifier is a product identifier that identifies a product with which the support ticket is associated, and the curated structured information file is categorized in association with the product in the searchable technical support information data store.

4. The method of claim 2, further comprising using the subject identifier as a lookup key in a database of mappings from subject identifiers to categorizations for the searchable technical support information data store.

5. The method of claim 1, wherein the curated structured information file is searchable in the searchable technical support information data store by any of the plurality of fields in the structured information file.

6. A computing system comprising:
one or more processors;
one or more computer-readable tangible data storage devices;
program instructions, stored on at least one of the one or more computer-readable tangible data storage devices, to map information from a plurality of fields of a support ticket in a technical support reporting tool to a plurality of corresponding fields of a structured information file;
program instructions, stored on at least one of the one or more computer-readable tangible data storage devices, to render the structured information file in a user-editable format in a user interface;
program instructions, stored on at least one of the one or more computer-readable tangible data storage devices, to render a plurality of fields of a communication record associated with the electronic support ticket in the user interface, together with rendering the structured information file in the user-editable format in the user interface;
program instructions, stored on at least one of the one or more computer-readable tangible data storage devices, to provide a drag-and-drop function from the plurality of fields of the communication record to any of the plurality of fields of the structured information file in the user interface;
program instructions, stored on at least one of the one or more computer-readable tangible data storage devices, to section portions of the communication record into selectable portions enabled for the drag-and-drop function from the plurality of fields of the communication record to the plurality of the structured information file in the user interface;
program instructions, stored on at least one of the one or more computer-readable tangible data storage devices, to detect a stack trace specific to code of a particular client in the support ticket;
program instructions, stored on at least one of the one or more computer-readable tangible data storage devices, to remove at least one of private or sensitive data from the support ticket in the structured information file, wherein the private or sensitive data comprise the stack trace specific to the particular client;
program instructions, stored on at least one of the one or more computer-readable tangible data storage devices, to save user inputs to the plurality of fields of the structured information file, thereby generating a curated structured information file that incorporates the mapped information and the user inputs; and
program instructions, stored on at least one of the one or more computer-readable tangible data storage devices, to save the curated structured information file to a searchable technical support information data store,
wherein the program instructions to remove the at least one of the private or sensitive data from the support ticket in the structured information file comprise program instructions to automatically use search keys to identify and remove the at least one of the private or sensitive data from a block of text before the block of text is mapped into the structured information file.

7. The computing system of claim 6, further comprising:
program instructions, stored on at least one of the one or more computer-readable tangible data storage devices, to read a subject identifier from a subject identifier field in the support ticket, and categorize the curated structured information file in the searchable technical support information data store in accordance with the subject identifier, wherein the subject identifier is a product identifier that identifies a product with which the support ticket is associated, and the curated structured information file is categorized in association with the product in the searchable technical support information data store.

8. The computing system of claim 6, wherein the information page is searchable in the searchable technical support information data store by any of the plurality of fields in the information page.

9. A computer program product comprising:

one or more non-transitory computer-readable data storage media;

program instructions, stored on at least one of the one or more non-transitory computer-readable data storage media, to map information from a plurality of fields of a support ticket in a technical support reporting tool to a plurality of corresponding fields of a structured information file;

program instructions, stored on at least one of the one or more non-transitory computer-readable data storage media, to render the structured information file in a user-editable format in a user interface;

program instructions, stored on at least one of the one or more non-transitory computer-readable data storage media, to render a plurality of one or more fields of a communication record associated with the electronic support ticket in the user interface, together with rendering the structured information file in the user-editable format in the user interface;

program instructions, stored on at least one of the one or more non-transitory computer-readable data storage media, to provide a drag-and-drop function from the plurality of fields of the communication record to any of the plurality of fields of the structured information file in the user interface;

program instructions, stored on at least one of the one or more non-transitory computer-readable data storage media, to section portions of the communication record into selectable portions enabled for the drag-and-drop function from the plurality of fields of the communication record to the plurality of fields of the structured information file in the user interface;

program instructions, stored on at least one of the one or more non-transitory computer-readable data storage media, to detect a stack trace specific to code of a particular client in the support ticket;

program instructions, stored on at least one of the one or more non-transitory computer-readable data storage media, to remove at least one of private or sensitive data from the support ticket in the structured information file, wherein the private or sensitive data comprise at least one of the stack trace specific to the particular client;

program instructions, stored on at least one of the one or more non-transitory computer-readable data storage media, to save user inputs to the plurality of fields of the structured information file, thereby generating a curated structured information file that incorporates the mapped information and the user inputs; and program instructions, stored on at least one of the one or more non-transitory computer-readable data storage media, to save the curated structured information file to a searchable technical support information data store, wherein the program instructions to remove the at least one of the private or sensitive data from the support ticket in the structured information file comprise program instructions to automatically use search keys to identify and remove the at least one of the private or sensitive data from a block of text before the block of text is mapped into the structured information file.

10. The computer program product of claim 9, further comprising:

program instructions, stored on at least one of the one or more non-transitory computer-readable data storage media, to read a subject identifier from a subject identifier field in the support ticket, and categorize the curated structured information file in the searchable technical support information data store in accordance with the subject identifier, wherein the subject identifier is a product identifier that identifies a product with which the support ticket is associated, and the curated structured information file is categorized in association with the product in the searchable technical support information data store.

11. The computer program product of claim 9, wherein the information page is searchable in the searchable technical support information data store by any of the plurality of fields in the information page.

12. The method of claim 1, wherein removing at least one of private or sensitive data from the support ticket in the structured information file comprises:

excluding the stack trace specific to the code of the particular client in the structured information file.

13. The method of claim 1, wherein removing at least one of private or sensitive data from the support ticket in the structured information file comprises:

detecting the file name, the document text, or the spreadsheet data specific to the particular client in the support ticket; and excluding the file name, the document text, or the spreadsheet data specific to the particular client in the structured information file.

14. The method of claim 1, wherein removing at least one of private or sensitive data from the support ticket in the structured information file comprises:

detecting a field identified with the private or sensitive data in the support ticket; and excluding data from the field identified with the private or sensitive data in the structured information file.

15. The method of claim 1, wherein removing at least one of private or sensitive data from the support ticket in the structured information file comprises:

using a pattern recognition technique to identify and remove the private or sensitive data from a block of text before the block of text is mapped into the structured information file.

* * * * *